US006129584A

United States Patent [19]
Chiba et al.

[11] Patent Number: 6,129,584

[45] Date of Patent: Oct. 10, 2000

[54] ASYMMETRIC CONNECTOR AND METHOD OF MOUNTING THE SAME ONTO PRINTED BOARD

[75] Inventors: Takayuki Chiba; Kenichi Hatakeyama, both of Iwate, Japan

[73] Assignee: NEC Corporation, Tokyo, Japan

[21] Appl. No.: 09/140,655

[22] Filed: Aug. 26, 1998

[30] Foreign Application Priority Data

Aug. 28, 1997 [JP] Japan .................................... 9-232856

[51] Int. Cl.[7] .............................. H01R 13/73; H02B 1/01

[52] U.S. Cl. .............................................................. 439/573

[58] Field of Search .............................. 439/79, 571, 572, 439/573, 943, 731, 751; 29/842, 845

[56] References Cited

U.S. PATENT DOCUMENTS

| | | | |
|---|---|---|---|
| 4,611,399 | 9/1986 | Tavares et al. . | |
| 5,194,019 | 3/1993 | Rose | 439/573 |
| 5,363,551 | 11/1994 | Cottet et al. . | |
| 5,971,802 | 10/1999 | Pan et al. | 439/573 |

FOREIGN PATENT DOCUMENTS

| | | |
|---|---|---|
| 0 264 322 | 4/1988 | European Pat. Off. . |
| 0 376 659 | 7/1990 | European Pat. Off. . |
| 0 767 516 | 5/1995 | European Pat. Off. . |
| 1-70296 | 5/1989 | Japan . |

*Primary Examiner*—Michael L. Gellner
*Assistant Examiner*—Antoine Ngandjui
*Attorney, Agent, or Firm*—Sughrue, Mion, Zinn, Macpeak & Seas, PLLC

[57] ABSTRACT

There is provided an asymmetric connector including (a) a plurality of L-shaped terminals having first and second ends, and (b) a housing block in which the L-shaped terminals are arranged in a row, the housing block having a side wall formed with an opening in facing relation to the first ends of the L-shaped terminals, and a flat bottom through which the second ends of the L-shaped terminals project, the housing block being formed at the flat bottom thereof with at least one hole, and further being formed at an upper surface thereof with a recess into which a pushing jig is to be inserted for downwardly pushing the asymmetric connector. The above-mentioned asymmetric connector ensures that the asymmetric connector is accurately positioned relative to a printed wiring board to which the asymmetric board is to be mounted, and that the asymmetric connector is uniformly inserted into a printed wiring board, resulting in that it is possible to prevent buckling of terminals, floating of a housing block, and oblique insertion of terminals into a printed wiring board.

28 Claims, 4 Drawing Sheets

ASYMMETRIC CONNECTOR AND METHOD OF MOUNTING THE SAME ONTO PRINTED BOARD

BACKGROUND OF THE INVENTION

1. Field of the Invention

The invention relates to an asymmetric connector and a method of mounting the same onto a printed board.

2. Description of the Related Art

There have been suggested a lot of asymmetric connectors and methods of fixing such asymmetric connectors on a printed wiring board. For instance, Japanese Unexamined Utility Model Publication No. 1-70296 published on May 10, 1989 has suggested an asymmetric connector including a plate having a movable pin for keeping a surface of the connector through which the connector makes contact with a printed wiring board in parallel with a surface of the printed wiring board on which the connector is to be mounted. The plate supports the asymmetric connector at side, and the use of the plate makes it necessary to carry out a step of compensating for inclination of the connector which often occurs when the connector is fixed onto a printed wiring board.

FIG. 1 is a side view, partially a cross-sectional view, of the asymmetric connector suggested in the above-mentioned Publication. As illustrated in FIG. 1, the asymmetric connector is comprised of a first insulating block 20, a second insulating block 21 equipped with a plurality of pins 23 projecting therefrom, and a substrate 22 connecting the first and second insulating blocks 20 and 21 with each other. There are employed a plate 24, and a punch 30 for press-fitting the connector into a printed wiring board 8.

The plate 24 has a surface 25 on which the printed wiring board 8 is placed, and is formed with a recess 26 into which the pins 23 passing through the printed wiring board 8 escapes. Though the recess 26 is illustrated as a rectangular recess in FIG. 1, the recess 26 is actually comprised of a plurality of holes each associated with the pins 23.

The plate 24 is formed at the front thereof with a vertically extending hole 28. A movable pin 29 is slidably fit in the hole 28, and is upwardly biased by a spring 27 fixed at a bottom of the hole 28. A movable pin 29 has an axis in parallel with an axis of the recess 26. The movable pin 29 supports the first insulating block 20 therewith, and keeps the substrate 22 and the surface 25 in parallel with each other. The movable pin 29 is inserted in the hole 28 so that a distal end of the movable pin 29 projects beyond the upper surface 25 of the plate 24.

While the asymmetric connector is being press-fit into the printed wiring board 8 with the aid of the punch 30, the substrate 22 is kept in parallel with the surface 25 of the plate 24 by the movable pin 29.

However, the above-mentioned conventional asymmetric connector and method of fixing the connector onto a printed wiring board have problems as follows.

First, the above-mentioned asymmetric connector has no means for positioning itself relative to the printed wiring board 8 and the plate 24. Hence, it takes much time, when the asymmetric connector is mounted onto the printed wiring board 8, to position the asymmetric connector relative to the printed wiring board 8, and the printed wiring board 8 relative to the plate 24.

Second, since it is necessary in the above-mentioned conventional asymmetric connector for the movable pin 29 to project beyond the upper surface 25 of the plate 24, the conventional asymmetric connector may be applied only to press-fitting at a marginal end of the printed wiring board 8.

Thus, it is quite difficult in the above-mentioned conventional asymmetric connector and method of mounting the connector onto a printed wiring board to prevent inclination of the asymmetric connector which often occurs when the connector is press-fit into a printed wiring board, avoid terminals of the connector from being buckled, and find a location of a printed wiring board at which the connector is press-fit thereinto. In addition, it is quite difficult or almost impossible to press-fit the connector into a printed wiring board at a desired location.

SUMMARY OF THE INVENTION

In view of the foregoing problems of the conventional connector and method, it is an object of the present invention to provide an asymmetric connector and a method of mounting the same onto a printed wiring board both of which are capable of preventing inclination of a connector which would occur when a connector is press-fit into a printed wiring board, buckling of terminals which would occur while a connector is being press-fit into a printed wiring board, and floating of a housing.

Another object of the present invention is to provide an asymmetric connector and a method of mounting the same onto a printed wiring board both of which are capable of readily positioning both a connector relative to a printed wiring board, and a printed wiring board relative to a receiving jig on which the printed wiring board is to be placed.

A further object of the present invention is to provide an asymmetric connector and a method of mounting the same onto a printed wiring board both of which are capable of press-fitting a connector into a printed wiring board at a desired location.

In one aspect of the present invention, there is provided an asymmetric connector including (a) a plurality of L-shaped terminals having first and second ends, and (b) a housing block in which the L-shaped terminals are arranged in a row, wherein the housing block has a side wall formed with an opening in facing relation to the first ends of the L-shaped terminals, and a flat bottom through which the second ends of the L-shaped terminals project, and the housing block is formed at the flat bottom thereof with at least one hole, and further formed at an upper surface thereof with a recess into which a pushing jig is to be inserted for downwardly pushing the asymmetric connector.

It is preferable that the hole is formed at opposite ends or one of opposite ends of the flat bottom of the housing block. For instance, the hole may be designed to have a function of positioning the asymmetric connector to a board to which the asymmetric connector is to be fixed, and a function of fixating the asymmetric connector to the board by means of a screw.

The recess may be comprised of a plurality of smaller recesses, in which case, each of the smaller recesses may be located between the first ends of the L-shaped terminals. As an alternative, the recess may be formed elongated, having an entire length covering the row of the L-shaped terminals, in which case, the recess may be located above the L-shaped terminals, and the L-shaped terminals may be designed to have an inwardly bending portion at a corner thereof so as to avoid interference with the recess.

It is preferable that the hole and the recess are located oppositely to each other in a width-wise direction of the housing block. It is preferable that the L-shaped terminals are inserted into through-holes formed at a surface of a board without being soldered.

In another aspect of the present invention, there is provided a combination of an asymmetric connector and a pushing jig, the asymmetric connector including (a) a plurality of L-shaped terminals having first and second ends, and (b) a housing block in which the L-shaped terminals are arranged in a row, the housing block having a side wall formed with an opening in facing relation to the first ends of the L-shaped terminals, and a flat bottom through which the second ends of the L-shaped terminals project, the housing block being formed at the flat bottom thereof with at least one hole, and further being formed at an upper surface thereof with a recess into which a pushing jig is to be inserted for downwardly pushing the asymmetric connector, the pushing jig being designed to have an outer shape for fitting into the recess.

The recess may be comprised of a plurality of smaller recesses each located between the first ends of the L-shaped terminals, in which case, the pushing jig is preferably designed to have teeth each of which is to fit into an associated smaller recess.

The recess may be formed elongated, having an entire length covering the row of the L-shaped terminals, and wherein the pushing jig is designed to have an outer shape to fit into the elongated recess.

For instance, the pushing jig is comprised of a jig plate coextensive with an upper surface of the housing block, and a tooth downwardly extending from the jig plate and having an outer shape for fitting into the recess.

There is further provided a combination of an asymmetric connector, a pushing jig, and a receiving jig, the asymmetric connector including (a) a plurality of L-shaped terminals having first and second ends, and (b) a housing block in which the L-shaped terminals are arranged in a row, the housing block having a side wall formed with an opening in facing relation to the first ends of the L-shaped terminals, and a flat bottom through which the second ends of the L-shaped terminals project, the housing block being formed at the flat bottom thereof with at least one hole, and further being formed at an upper surface thereof with a recess into which a pushing jig is to be inserted for downwardly pushing the asymmetric connector, the pushing jig being designed to have an outer shape for fitting into the recess, the receiving jig including at least one pin standing thereon, the pin being inserted into the hole of the housing block when the housing block is downwardly pushed by the pushing jig.

The hole may be formed at at least one of opposite ends of the flat bottom of the housing block, in which case, the pin may be formed at one of opposite ends of the receiving jig accordingly.

In still another aspect of the present invention, there is provided a method of mounting an asymmetric connector onto a printed wiring board with the aid of a pushing jig and a receiving jig, the asymmetric connector comprising: (a) a plurality of L-shaped terminals, and (b) a housing block in which the L-shaped terminals are arranged in a row, the housing block having a flat bottom through which one of ends of the L-shaped terminals project, the housing block being formed at the flat bottom thereof with at least one hole, and further being formed at an upper surface thereof with a recess into which a pushing jig is to be inserted for downwardly pushing the asymmetric connector, the printed wiring board being formed with first through-holes into which the L-shaped terminals are inserted, and further with at least one second through-hole in alignment with the hole of the housing block, the pushing jig being designed to have an outer shape for fitting into the recess, the receiving jig including at least one pin standing thereon, the method including the steps of (a) inserting the pin of the receiving jig into the second through-hole of the printed wiring board, (b) temporarily inserting the ends of the L-shaped terminals into the first through-holes of the printed wiring board, (c) inserting the pin of the receiving jig into the hole of the housing block, and (d) pushing the pushing jig having been inserted into the recess of the housing block to push downwardly the housing block for completely inserting the ends of the L-shaped terminals into the printed wiring board.

It is preferable that the steps (b) and (c) are concurrently carried out. The method may further include the steps of (e) removing the receiving jig, and (f) fixing the asymmetric connector to the printed wiring board by screwing them through the hole of the housing block and the second through-hole of the printed wiring board.

In accordance with the present invention, the asymmetric connector is press-fit into a printed wiring board with the pin of the receiving jig acting as a positioner for positioning the hole of the housing block and the second through-hole of a printed wiring board to each other. Hence, it is possible to accurately and readily position the printed wiring board and the terminals to each other.

The housing block is formed at a flat bottom thereof with a hole for positioning the connector, and the printed wiring board is formed with the second through-hole and the receiving jig is formed with the pin, accordingly. Hence, it is possible to balance a force acting on the housing block when the connector is press-fit into a printed wiring board, which ensures that the connector is uniformly press-fit into a printed wiring board. Hence, it is possible to prevent buckling of terminals and floating of a housing block both of which would occur when a connector is press-fit into a printed wiring board, and oblique press-fitting of a connector into a printed wiring board.

In accordance with the present invention, the pin of the receiving jig is inserted into the second through-hole of a printed wiring board. The second through-hole may be formed anywhere in a printed wiring board. Accordingly, it is possible to mount a connector on a printed wiring board anywhere, for instance, at a marginal end or at the center of a printed wiring board.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Figure 1:
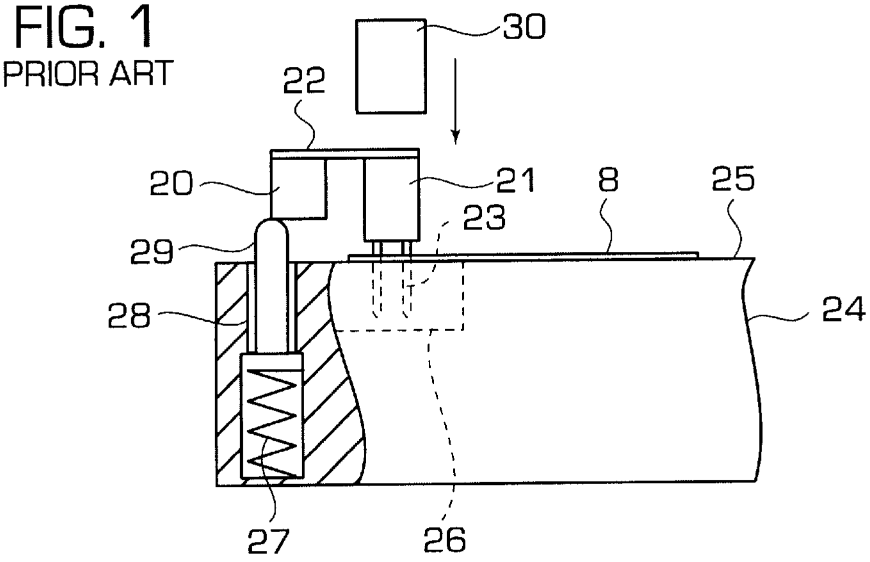
FIG. 1 PRIOR ART
FIG. 1 is a side view, partially a cross-sectional view, of a conventional asymmetric connector and a jig used for mounting the connector onto a printed wiring board.
Figure 2:
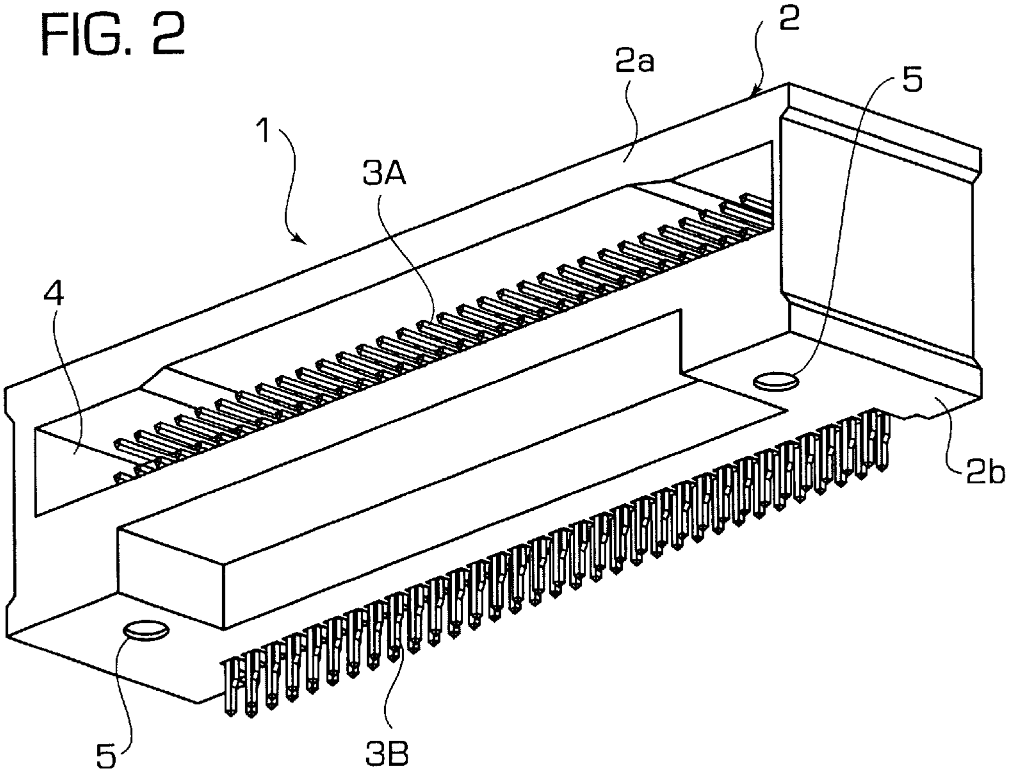
FIG. 2 is a perspective view illustrating an asymmetric connector in accordance with the first embodiment of the present invention.

FIG. 2 illustrates an asymmetric connector in accordance with the first embodiment. As illustrated in FIG. 2, the asymmetric connector 1 includes a plurality of L-shaped terminals each having a terminal section 3A at one end and a connection section 3B at the other end, and a housing block 2 in which the L-shaped terminals are arranged in two rows.

The L-shaped terminals are inserted into later mentioned through-holes formed at a surface of a printed wiring board without being soldered.

The housing block 2 has an rectangular parallelopiped outer shape, and has a side wall 2*a* formed with a rectangular opening 4 in facing relation to the terminal section 3A of the L-shaped terminals, and a flat bottom 2*b* through which the connection section 3B of the L-shaped terminals project.

Figure 3:
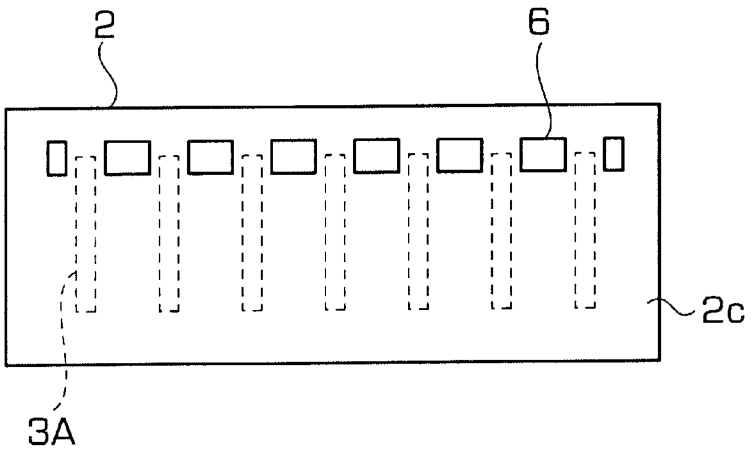
FIG. 3 is a top view of the asymmetric connector illustrated in FIG. 2.

The housing block 2 is formed at opposite ends of the flat bottom 2*b* with circular positioner holes 5. The positioner holes 5 are internally threaded. As illustrated in FIG. 3, the housing block 2 is further formed at an upper surface 2*c* thereof with a plurality of rectangular recesses 6 into which a later mentioned pushing jig is to be inserted for downwardly pushing the housing block 2. The positioner holes 5 and the recesses 6 are located oppositely to each other in a width-wise direction of the housing block 2.

Figure 5B:
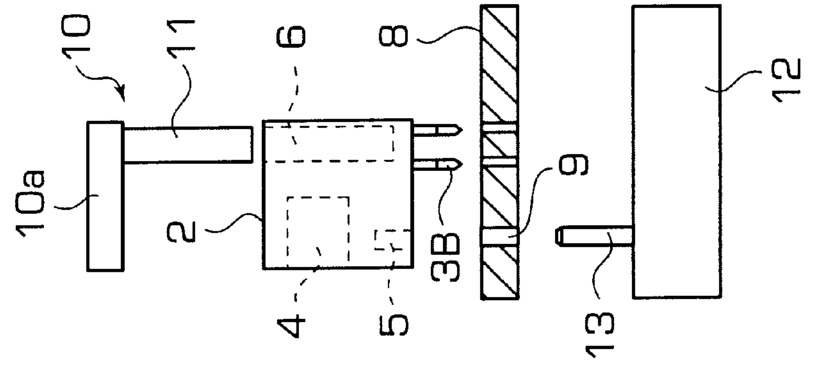
FIG. 5B is a side view illustrating an asymmetric connector, a pushing jig, a printed wiring board, and a receiving jig in a condition before the asymmetric connector is press-fit into the printed wiring board.
Figure 5A:
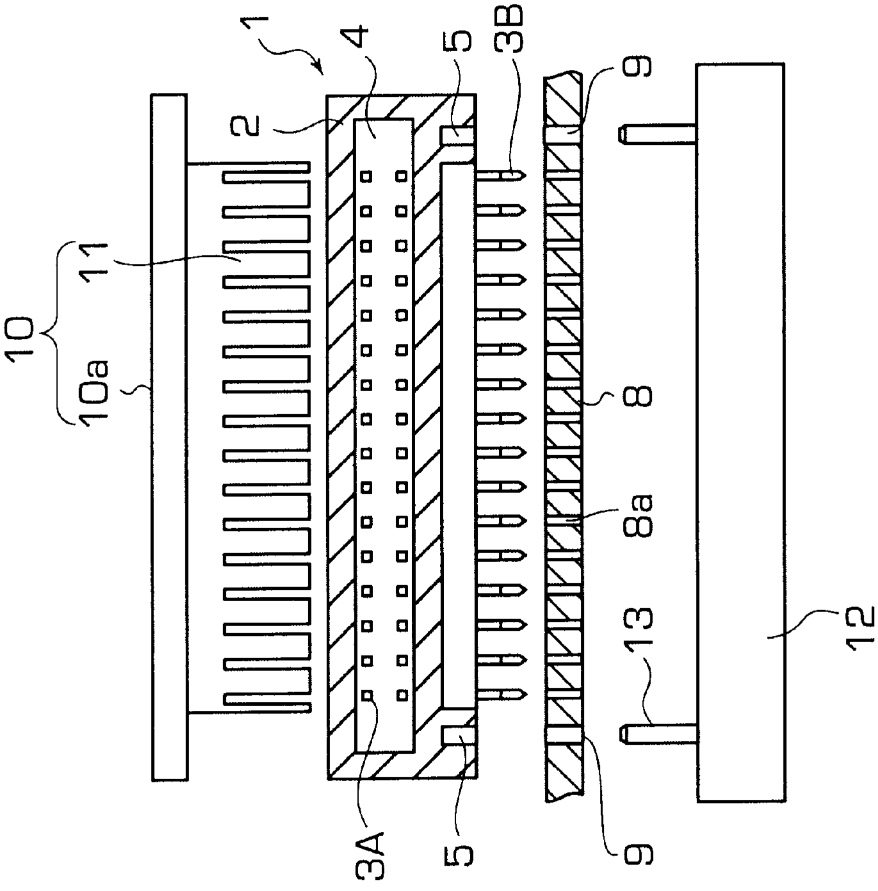
FIG. 5A is a front view illustrating an asymmetric connector, a pushing jig, a printed wiring board, and a receiving jig in a condition before the asymmetric connector is press-fit into the printed wiring board.

A pushing jig 10 and a receiving jig 12 are used for press-fitting the asymmetric connector 1 into a printed wiling board 8, as illustrated in FIGS. 5A and 5B. The positioner holes 5 formed at the flat bottom 2*b* of the housing block 2 ensure that the asymmetric connector 1 is accurately positioned relative to the printed wiring board 8, that the connection sections 3B of the L-shaped terminals are readily and accurately inserted into through-holes 8*a* formed through the printed wiring board 8, and that the asymmetric connector 1 is not inclined relative to the printed wiring board 8. In addition, since the positioner holes 5 are internally threaded, the asymmetric connector 1 may be screwed to the printed wiring board 8 after the asymmetric connector 1 has been press-fit to the printed wiring board 8.

Another printed wiring board is inserted into the asymmetric connector 1 through the opening 4. The asymmetric connector 1 may be press-fit into the printed wiring board 8 after or before another printed wiring board has been inserted into the asymmetric connector 1 through the opening 4.

FIG. 3 illustrates the flat bottom 2*b* of the asymmetric connector 1 through which the asymmetric connector 1 is press-fit into the printed wiring board 8. As illustrated, each of the recesses 6 is formed between the terminal sections 3A of the L-shaped terminals which are arranged in a row in parallel with one another. The recesses 6 are located in the vicinity of corners of the L-shaped terminals. That is, the recesses 6 are formed at the flat bottom 2*b* of the housing block 2 so that they are equally spaced away from one another.

The pushing jig 10 is comprised of a jig plate 10*a* and comb-like teeth 11 extending downwardly from the jig plate 10*a*, as illustrated in FIGS. 5A and 5B. The jig plate 10*a* is coextensive with the upper surface 2*c* of the housing block 2. Each of the comb-like teeth 11 is inserted into an associated recess 6. Since the recesses 6 are formed between the L-shaped terminals, even when the pushing jig 10 is inserted into the recesses 6, the pushing jig 10 does not interfere with the L-shaped terminals.

Figure 4A:
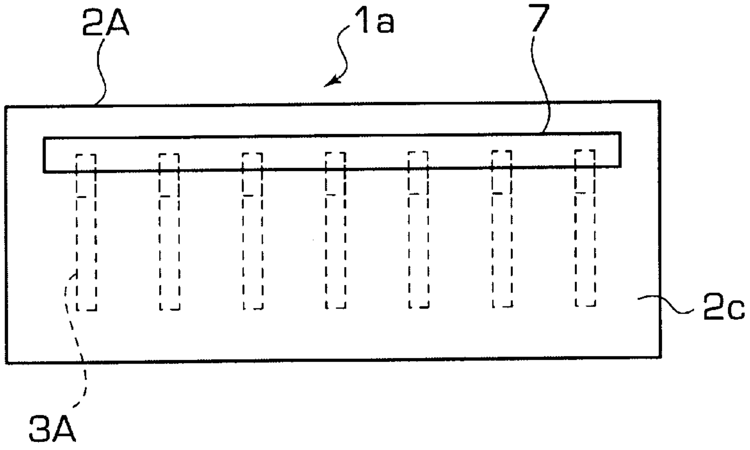
FIG. 4A is a front view illustrating an asymmetric connector in accordance with the second embodiment of the present invention.
Figure 4B:
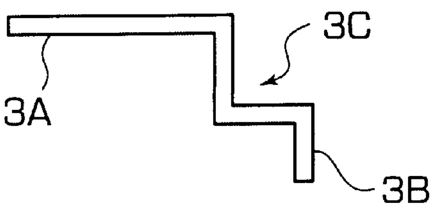
FIG. 4B is a plan view of a terminal used for the asymmetric connector illustrated in FIG. 4A.

FIG. 4A is a top view of a housing block to be used for an asymmetric connector 1*a* in accordance with the second embodiment of the present invention, and FIG. 4B is a side view illustrating an L-shaped terminal used for the asymmetric connector 1*a* illustrated in FIG. 4A. The asymmetric connector 1*a* in accordance with the second embodiment is different from the asymmetric connector in accordance with the first embodiment in a structure of an L-shaped terminal supported in a housing block 2A, and an outer shape of a recess 7 formed at an upper surface 2*c* of the housing block 2A, into which the pushing jig 10 is inserted for downwardly pushing the housing block 2A. Namely, the housing block 2A is formed at an upper surface 2*c* thereof with the single elongated recess 7 having an entire length covering the row of the L-shaped terminals.

The elongated recess 7 is located just above corners of the L-shaped terminals. Hence, if the pushing jig 10 is inserted into the recess 7, the pushing jig 10 interferes with the L-shaped terminals Thus, in order to avoid such interference between the pushing jig 10 and the L-shaped terminals, the L-shaped terminals are designed to have an inwardly bending portion 3C at a corner thereof Hence, the terminals in the second embodiment are nearly reverse-W shaped.

Accordingly, the pushing jig 10 may be designed to have an elongated tooth which is fit into the rectangular recess 7. The pushing jig 10 having the comb-like teeth 11 illustrated in FIG. 5A may be also used.

FIGS. 5A and 5B are front and side views illustrating the asymmetric connector 1, the pushing jig 10, the printed wiring board 8, and the receiving jig 12 in a condition before and after the asymmetric connector 1 is press-fit into the printed wiring board 8. As illustrated in FIGS. 5A and 5B, the receiving jig 12 and the pushing jig 10 having the comb-like teeth 11 are used for press-fitting the asymmetric connector 1 into the printed wiring board 8.

The receiving jig 12 has two pins 13 standing thereon in the same pitch as a pitch between the positioner holes 5 of the housing block 2. The printed wiring board 8 is formed at opposite ends thereof with two through-holes 9 in the same pitch as a pitch between the positioner holes 5 of the housing block 2.

The asymmetric connector 1 is press-fit into the printed wiring board 8 as follows.

First, the pins 13 of the receiving jig 12 are fit into the holes 9 of the printed wiring board 8 for positioning the printed wiring board 8 and the receiving jig 12 to each other. Then, the L-shaped terminals are temporarily inserted at the connection section 3B into the through-holes 8*a* of the printed wiring board 8. At the same time, the pins 13 are inserted into the positioner holes 5 of the housing block 2.

Thus, the pins 13 act as a guide for positioning the printed wiring board 8 and the asymmetric connector 1.

Figure 6B:
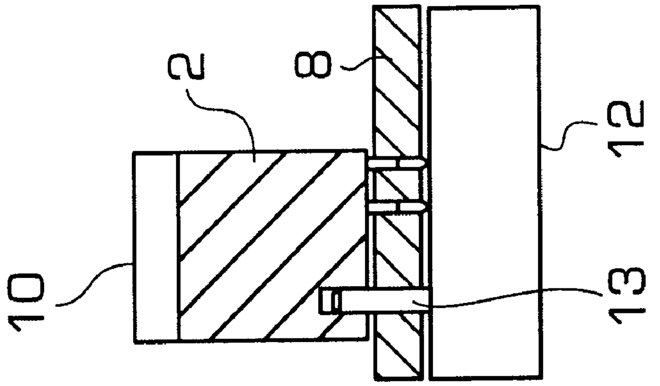
FIG. 6B is a side view of the asymmetric connector, the pushing jig, the printed wiring board, and the receiving jig all illustrated in FIGS. 5A and 5B, in a condition after the asymmetric connector has been press-fit into the printed wiring board.
Figure 6A:
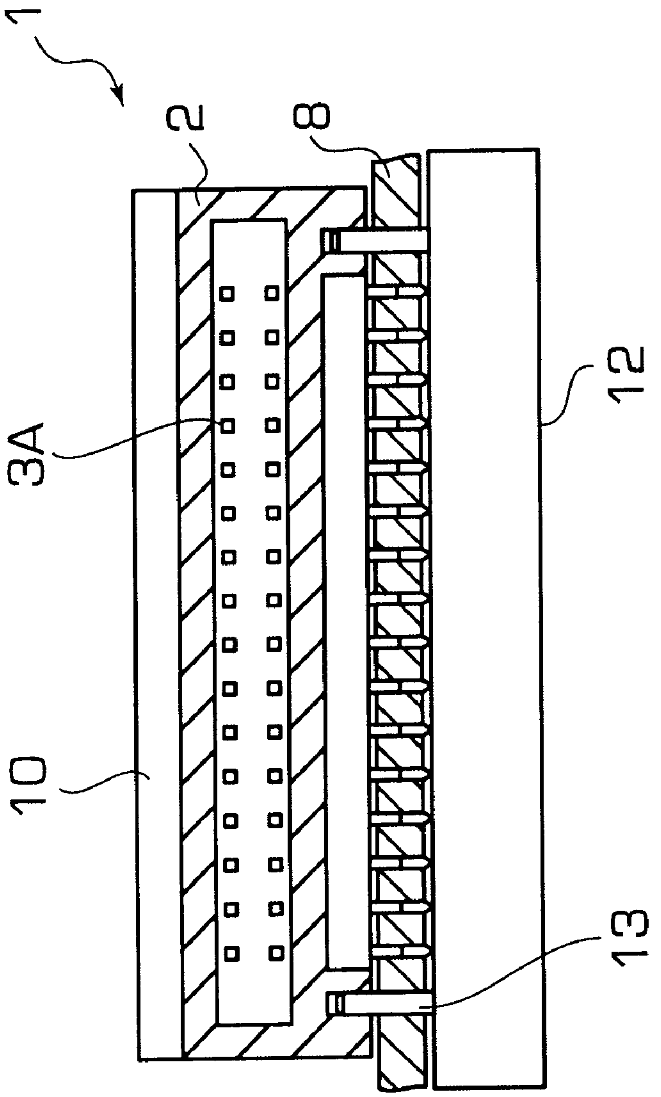
FIG. 6A is a front view of the asymmetric connector, the pushing jig, the printed wiring board, and the receiving jig all illustrated in FIGS. 5A and 5B, in a condition after the asymmetric connector has been press-fit into the printed wiring board.

FIGS. 6A and 6B illustrates a condition after the asymmetric connector 1 has been press-fit into the printed wiring board 8. As illustrated, the pushing jig 10 is downwardly pushed to thereby completely press-fit the connection section 3B of the L-shaped terminals into the printed wiring board 8. Since the jig plate 10*a* entirely covers the upper surface 2*c* of the housing block 2, the pressure is exerted uniformly over the asymmetric connector 1. Though a force acts on the asymmetric connector 1 to incline the housing block 2 towards opposite ends to the L-shaped terminals, the pins 13 of the receiving jig 12 cancel such force. Hence, the asymmetric connector 1 is press-fit into the printed wiring board 8 without being inclined.

After the asymmetric connector 1 has been completely press-fit into the printed wiring board 8, the receiving jig 12 is removed. Then, the asymmetric connector 1 is screwed to the printed wiring board 8 through the internally threaded holes 5 of the housing block 2 and the holes 9 of the printed wiring board 8. Thereafter, the pushing jig 10 is taken away from the recesses 6.

As having been explained so far, in accordance with the above-mentioned embodiment, the pins 13 of the receiving jig 12 cancel a force which attempts to incline the asymmetric connector 1, when the asymmetric connector 1 is downwardly pushed through the pushing jig 10. Hence, the asymmetric connector can be accurately press-fit into the printed wiring board 8 without being inclined.

Since the asymmetric connector 1 is press-fit into the printed wiring board 8 by temporarily fitting the pins 13 into both the holes 9 of the printed wiring board 8 and the positioner holes 5 of the housing block 2, it is possible to accurately and readily position the printed wiring board 8 and the asymmetric connector 1 to each other.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 9-232856 filed on Aug. 28, 1997 including specification, claims, drawings and summary is incorporated herein by reference in its entirety.

What is claimed is:

1. An asymmetric connector comprising:

(a) a plurality of L-shaped terminals having first and second ends; and (b) a housing block in which said L-shaped terminals are arranged in a row, said housing block having a side wall formed with an opening in facing relation to said first ends of said L-shaped terminals, and a flat bottom through which said second ends of said L-shaped terminals project, said housing block being formed at said flat bottom thereof with at least one hole, and further being formed at an upper surface thereof with a recess into which a pushing jig is to be inserted for downwardly pushing said asymmetric connector.

2. The asymmetric connector as set forth in claim 1, wherein said hole is formed at at least one of opposite ends of said flat bottom of said housing block.

3. The asymmetric connector as set forth in claim 1, wherein said hole and said recess are located opposite of each other in a width-wise direction of said housing block.

4. The asymmetric connector as set forth in claim 1, wherein said L-shaped terminals are inserted into through-holes formed at a surface of a board without being soldered.

5. The asymmetric connector as set forth in claim 1, wherein said hole positions said asymmetric connector to a board to which said asymmetric connector is to be fixed, and fixates said asymmetric connector to said board by a screw.

6. The asymmetric connector as set forth in claim 5, wherein said hole is internally threaded.

7. The asymmetric connector as set forth in claim 1, wherein said recess is comprised of a plurality of smaller recesses.

8. The asymmetric connector as set forth in claim 7, wherein each of said smaller recesses is located between said first ends of said L-shaped terminals.

9. The asymmetric connector as set forth in claim 1, wherein said recess is formed elongated, having an entire length covering said row of said L-shaped terminals.

10. The asymmetric connector as set forth in claim 9, wherein said recess is located above said L-shaped terminals, and wherein said L-shaped terminals are designed to have an inwardly bending portion at a corner thereof so as to avoid interference with said recess.

11. A combination of an asymmetric connector and a pushing jig, said asymmetric connector comprising:

(a) a plurality of L-shaped terminals having first and second ends; and (b) a housing block in which said L-shaped terminals are arranged in a row, said housing block having a side wall formed with an opening in facing relation to said first ends of said L-shaped terminals, and a flat bottom through which said second ends of said L-shaped terminals project, said housing block being formed at said flat bottom thereof with at least one hole, and further being formed at an upper surface thereof with a recess into which a pushing jig is to be inserted for downwardly pushing said asymmetric connector, said pushing jig being designed to have an outer shape for fitting into said recess.

12. The combination as set forth in claim 11, wherein said recess is comprised of a plurality of smaller recesses each located between said first ends of said L-shaped terminals, and wherein said pushing jig is designed to have teeth each of which is to fit into an associated smaller recess.

13. The combination as set forth in claim 11, wherein said pushing jig comprises a jig plate coextensive with an upper surface of said housing block, and a tooth downwardly extending from said jig plate and having an outer shape for fitting into said recess.

14. The combination as set forth in claim 11, wherein said hole and said recess are located opposite of each other in a width-wise direction of said housing block.

15. The combination as set forth in claim 11, wherein said hole is internally threaded.

16. The combination as set forth in claim 11, wherein said recess is formed elongated, having an entire length covering said row of said L-shaped terminals, and wherein said pushing jig is designed to have an outer shape to fit into said elongated recess.

17. The combination as set forth in claim 16, wherein said recess is located above said L-shaped terminals, and wherein said L-shaped terminals are designed to have an inwardly bending portion at a corner thereof so as to avoid interference with said recess.

18. A combination of an asymmetric connector, a pushing jig, and a receiving jig, said asymmetric connector comprising:

(a) a plurality of L-shaped terminals having first and second ends; and (b) a housing block in which said L-shaped terminals are arranged in a row, said housing block having a side wall formed with an opening in facing relation to said first ends of said L-shaped terminals, and a flat bottom through which said second ends of said L-shaped terminals project, said housing block being formed at said flat bottom thereof with at least one hole, and further being formed at an upper surface thereof with a recess into which a pushing jig is to be inserted for downwardly pushing said asymmetric connector, said pushing jig being designed to have an outer shape for fitting into said recess, said receiving jig including at least one pin standing thereon, said pin being inserted into said hole of said housing block when said housing block is downwardly pushed by said pushing jig.

19. The combination as set forth in claim 18, wherein said hole is formed at at least one of opposite ends of said flat bottom of said housing block, and said pin is formed at one of opposite ends of said receiving jig.

20. The combination as set forth in claim 18, wherein said recess is comprised of a plurality of smaller recesses each located between said first ends of said L-shaped terminals, and wherein said pushing jig is designed to have teeth each of which is to fit into an associated smaller recess.

21. The combination as set forth in claim 18, wherein said hole and said recess are located opposite of each other in a width-wise direction of said housing block.

22. The combination as set forth in claim 18, wherein said hole is internally threaded.

23. The combination as set forth in claim 18, wherein said pushing jig is comprised of a jig plate coextensive with an upper surface of said housing block, and a tooth downwardly extending from said jig plate and having an outer shape for fitting into said recess.

24. The combination as set forth in claim 18, wherein said recess is formed elongated, having an entire length covering said row of said L-shaped terminals, and wherein said pushing jig is designed to have an outer shape to fit into said elongated recess.

25. The combination as set forth in claim 24, wherein said recess is located above said L-shaped terminals, and wherein said L-shaped terminals are designed to have an inwardly bending portion at a corner thereof so as to avoid interference with said recess.

26. A method of mounting an asymmetric connector onto a printed wiring board with the aid of a pushing jig and a receiving jig, said asymmetric connector comprising: (a) a plurality of L-shaped terminals; and (b) a housing block in which said L-shaped terminals are arranged in a row, said housing block having a flat bottom through which one of ends of said L-shaped terminals project, said housing block being formed at said flat bottom thereof with at least one hole, and further being formed at an upper surface thereof with a recess into which a pushing jig is to be inserted for downwardly pushing said asymmetric connector, said printed wiring board being formed with first through-holes into which said L-shaped terminals are inserted, and further with at least one second through-hole in alignment with said hole of said housing block, said pushing jig being designed to have an outer shape for fitting into said recess, said receiving jig including at least one pin standing thereon, said method comprising the steps of:

(a) inserting said pin of said receiving jig into said second through-hole of said printed wiring board;

(b) temporarily inserting said ends of said L-shaped terminals into said first through-holes of said printed wiring board;

(c) inserting said pin of said receiving jig into said hole of said housing block; and (d) pushing said pushing jig having been inserted into said recess of said housing block to push downwardly said housing block for completely inserting said ends of said L-shaped terminals into said printed wiring board.

27. The method as set forth in claim 26, wherein said steps (b) and (c) are concurrently carried out.

28. The method as set forth in claim 26, further comprising the steps of:

(e) removing said receiving jig; and (f) fixing said asymmetric connector to said printed wiring board by screwing them through said hole of said housing block and said second through-hole of said printed wiring board.

* * * * *